United States Patent
Lee et al.

(10) Patent No.: US 8,295,031 B2
(45) Date of Patent: Oct. 23, 2012

(54) ELECTRIC DOUBLE LAYER CAPACITOR AND METHOD OF MANUFACTURING THE SAME

(75) Inventors: Sang Kyun Lee, Gyunggi-do (KR); Ill Kyoo Park, Seoul (KR); Seung Heon Han, Seoul (KR); Jung Eun Noh, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 252 days.

(21) Appl. No.: 12/805,761

(22) Filed: Aug. 18, 2010

(65) Prior Publication Data

US 2011/0170235 A1    Jul. 14, 2011

(30) Foreign Application Priority Data

Jan. 12, 2010    (KR) ........................ 10-2010-0002879

(51) Int. Cl.
*H01G 9/00* (2006.01)

(52) U.S. Cl. ........ 361/502; 361/503; 361/504; 361/509; 361/512; 361/525

(58) Field of Classification Search .................. 361/502, 361/503–504, 509–512, 516–519, 523–525, 361/528–529; 29/25.01, 25.03
See application file for complete search history.

(56) References Cited

U.S. PATENT DOCUMENTS

| | | | |
|---|---|---|---|
| 5,253,148 A | | 10/1993 | Katsu |
| 5,450,279 A | * | 9/1995 | Yoshida et al. ............... 361/502 |
| 6,757,154 B2 | * | 6/2004 | Reynolds et al. .............. 361/502 |
| 6,781,817 B2 | * | 8/2004 | Andelman ..................... 361/503 |
| 7,206,189 B2 | * | 4/2007 | Reynolds, III ................. 361/502 |
| 7,548,409 B2 | * | 6/2009 | Kojima et al. ................. 361/503 |
| 7,817,403 B2 | * | 10/2010 | Tasaki et al. .................. 361/512 |
| 2006/0039099 A1 | | 2/2006 | Oizumi |

FOREIGN PATENT DOCUMENTS

| | | |
|---|---|---|
| JP | 2004-186540 | 7/2004 |
| JP | 2006-049289 | 2/2006 |

(Continued)

OTHER PUBLICATIONS

Korean Office Action mailed Oct. 17, 2011 issued in corresponding Korean Patent Application No. 10-2010-0002879.

(Continued)

*Primary Examiner* — Nguyen T Ha

(57) ABSTRACT

There is provided an electric double layer capacitor including: an exterior case having a housing space provided therein and formed of insulating resin; first and second external terminals buried in the exterior case, each having a first surface exposed to the housing space and a second surface exposed to an outside of the exterior case; and a chip-type electric double layer capacitor cell disposed in the housing space and electrically connected to the first surface. The chip-type electric double layer capacitor cell includes first and second electrodes facing each other and having electricity of opposite polarities applied thereto, at least one induction electrode layer disposed between the first and second electrodes and having no electricity applied thereto, and first and second separators disposed between the first electrode and the induction electrode layer and between the second electrode and the induction electrode layer, respectively.

12 Claims, 4 Drawing Sheets

FOREIGN PATENT DOCUMENTS

| | | |
|---|---|---|
| JP | 2006-128247 | 5/2006 |
| JP | 2008-182023 | 8/2008 |
| KR | 1992-0018787 | 10/1992 |
| KR | 10-2006-0050524 | 5/2006 |
| KR | 10-2008-0014134 | 2/2008 |
| KR | 10-0826410 | 4/2008 |
| TW | 200629316 | 8/2006 |
| WO | 2006/064837 | 6/2006 |

OTHER PUBLICATIONS

Japanese Office Action mailed Jan. 24, 2012 issued in corresponding Japanese Patent Application No. 2010-183921.

Chinese Office Action mailed Apr. 23, 2012 issued in corresponding Chinese Patent Application No. 2010259097.

Korean Office Action issued Apr. 21, 2011 in corresponding Korean Patent Application 10-2010-0002879.

* cited by examiner

ELECTRIC DOUBLE LAYER CAPACITOR AND METHOD OF MANUFACTURING THE SAME

CROSS-REFERENCE TO RELATED APPLICATIONS

This application claims the priority of Korean Patent Application No. 10-2010-0002879 filed on Jan. 12, 2010, in the Korean Intellectual Property Office, the disclosure of which is incorporated herein by reference.

BACKGROUND OF THE INVENTION

1. Field of the Invention

The present invention relates to an electric double layer capacitor and a method of manufacturing the same, and more particularly, to an electric double layer capacitor (EDLC) allowing for an increase in a surge voltage and an operating voltage and having a high energy storage density and a method of manufacturing the same.

2. Description of the Related Art

An electric double layer capacitor (EDLC) is an energy storage medium in which two electrodes of an anode and a cathode are arranged to face each other with a separator interposed therebetween so that a pair of charge layers (electric double layers) having different signs can be generated on the facing surfaces of the electrodes.

An EDLC is mainly used as an auxiliary power supply, an IC backup power supply or the like for a variety of electrical and electronic devices. In recent years, the EDLC has been widely used for applications including a toy, an industrial power supply, an uninterrupted power supply (UPS), solar energy storage, HEV/EV sub power, and the like.

An EDLC is generally manufactured by accommodating a unit cell in a case and then filling the case with an electrolyte. Here, the unit cell is constructed by alternately stacking electrodes and sheets of a separator.

Typically, in order to establish a proper voltage and capacitance required for an EDLC, two or more unit cells are connected in series and in parallel to form the EDLC.

A pair of electrodes have a positive polarity (+) or a negative polarity (−) determined according to the sign of external electricity applied thereto. Terminals to which external electricity are applied are drawn from the pair of electrodes.

In the pair of electrodes, positive (+) charges and negative (−) charges are polarized, and accordingly, two charge layers (electric double layers) are formed in a single unit cell.

In a conventional unit cell, however, a surge voltage is low, i.e., less than 3.0V, and an operating voltage is also low, i.e., 2.3V to 2.7V. Therefore, there is a problem in that two or more unit cells have to be connected in series in order to establish an operating voltage applicable to electronic products.

An EDLC has the area of facing surfaces (specific surface area) increased with the use of activated carbon electrodes, and capacitance improved with the use of an electrolyte. Increasing the area of the facing surfaces of the electrodes may increase capacitance.

Furthermore, the EDLC, which is an energy storage medium enabling instant charge/discharge, has a superior output characteristic to that of a battery but has a low voltage per unit cell since its voltage gradually drops simultaneously with discharge. Therefore, the EDLC has an energy storage density smaller than that of the battery. Accordingly, the EDLC has been generally used for an auxiliary power supply for the output of a battery, and an auxiliary power supply for other electrical and electronic devices.

Most of electronic products including ICs and backup power supply products require an operating voltage of 1.8V or greater, preferably a wide voltage range of 3V to 48V. Accordingly, in order for an EDLC to be used for these products, two or more unit cells are serially connected to increase the operating voltage.

However, in the case where two or more unit cells are serially connected to increase the operating voltage of a capacitor, there is another problem in that a balance problem between the unit cells, which inevitably occurs, should be solved. Specifically, there is a need for a voltage balance protection circuit such as a resistor, a diode and another IC so that the overall operating voltage of the capacitor is not concentrated on a single unit cell, in consideration of the capacitance of the unit cell, equivalent serial resistance (ESR), a leakage current, and the like.

Meanwhile, in an energy storage medium, a unique value is used to indicate the amount of energy that can be stored therein. In the case of a battery, 1 AH (storage capacity capable of supporting the use of a current of 1 A for an hour) is used to indicate the amount of energy, since the battery has a stable voltage range.

In the case of an EDLC, however, Farad (F) is used. Since the voltage of the EDLC varies simultaneously with discharge, F is used in accordance with the capacitance notation of a general condenser (capacitor). Furthermore, an ultra-high capacitance EDLC has capacitance that is one thousand to one million times larger than that of a general condenser with capacitance of mF, uF or the like. However, a conventional EDLC has an operating voltage that is significantly lower than that of an existing battery or condenser, as described above.

The energy storage amount that is a piece of data related to energy storage may be considered as a good index useful for comparison of the amount of energy even in the EDLC, in the same manner as a battery and a condenser. The energy storage amount can be obtained by the following equation:

$$\text{Largest energy storage amount } (J) = 1/2 CV^2$$

where C is capacitance per cell (F) and V is a voltage applicable to a cell.

From the above equation, it can be seen that the largest energy storage amount is proportional to capacitance but is also proportional to the square of voltage. In order words, if the voltage increases twice for the same area, the largest energy storage amount increases by four times. If the capacitance increases twice, however, the largest energy storage amount increases twice. Accordingly, it can be considered that the best way to increase the value of the largest energy storage amount available in an EDLC is to increase the voltage.

As described above, however, in the related art, unit cells are serially connected to increase an operating voltage. This method has a problem in that a high voltage is applied to anyone of the unit cells, since voltage balance among the unit cells is broken due to repeated cycles in the capacitance of the unit cell, a capacitance change rate, ESR, a resistance change rate, a leakage current, and a leakage current change rate. This causes an electrolyte to be dissolved (the electrolyte is dissolved when a voltage of 3.0V or more is applied thereto). It also results in increased internal resistance, reduced capacitance, and the like.

SUMMARY OF THE INVENTION

An aspect of the present invention provides an electric double layer capacitor allowing for an increase in a surge voltage and an operating voltage and having a high energy storage density and a method of manufacturing the same.

According to an aspect of the present invention, there is provided a chip-type electric double layer capacitor cell including: first and second electrodes facing each other and having electricity of opposite polarities applied thereto; at least one induction electrode layer disposed between the first and second electrodes and having no electricity applied thereto; and first and second separators disposed between the first electrode and the induction electrode layer and between the second electrode and the induction electrode layer, respectively.

The induction electrode layer may include a current collector and an electrode material formed on both surfaces of the current collector.

According to another aspect of the present invention, there is provided an electric double layer capacitor including: an exterior case having a housing space provided therein and formed of insulating resin; first and second external terminals buried in the exterior case, each having a first surface exposed to the housing space and a second surface exposed to an outside of the exterior case; and a chip-type electric double layer capacitor cell disposed in the housing space and electrically connected to the first surface, wherein the chip-type electric double layer capacitor cell includes first and second electrodes facing each other and having electricity of opposite polarities applied thereto, at least one induction electrode layer disposed between the first and second electrodes and having no electricity applied thereto, and first and second separators disposed between the first electrode and the induction electrode layer and between the second electrode and the induction electrode layer, respectively.

The induction electrode layer may include a current collector and an electrode material formed on both surfaces of the current collector.

The chip-type electric double layer capacitor cell may include stacked unit cells, each including the first and second electrodes facing each other and having electricity of opposite polarities applied thereto, the at least one induction electrode layer disposed between the first and second electrodes and having no electricity applied thereto, and the first and second separators disposed between the first electrode and the induction electrode layer and between the second electrode and the induction electrode layer, respectively.

The exterior case may be formed such that the insulating resin and the first and second external terminals are integrated.

The first and second external terminals may be formed on the same surface of the exterior case.

The exterior case may include a lower case having the housing space of which a top surface is opened and including the first and second external terminals buried therein, and an upper cap mounted on the lower case so as to cover the housing space.

According to another aspect of the present invention, there is provided a method of manufacturing an electric double layer capacitor, the method including: forming a lower case including a housing space of which a top surface is opened by integrating insulating resin and first and second external terminals, each of the first and second external terminals having a first surface exposed to the housing space and a second surface exposed to an outside of the lower case; preparing a chip-type electric double layer capacitor cell including first and second electrodes facing each other and having electricity of opposite polarities applied thereto, at least one induction electrode layer disposed between the first and second electrodes and having no electricity applied thereto, and first and second separators respectively disposed between the first electrode and the induction electrode layer and between the second electrode and the induction electrode layer; mounting the chip-type electric double layer capacitor cell in the housing space such that the chip-type electric double layer capacitor cell is electrically connected to the first surface exposed to the housing space; and mounting an upper cap on the lower case so as to cover the housing space.

The induction electrode layer may include a current collector and an electrode material formed on both surfaces of the current collector.

The chip-type electric double layer capacitor cell may include stacked unit cells, each including the first and second electrodes facing each other and having electricity of opposite polarities applied thereto, the at least one induction electrode layer disposed between the first and second electrodes and having no electricity applied thereto, and the first and second separators respectively disposed between the first electrode and the induction electrode layer and between the second electrode and the induction electrode layer.

The forming of the lower case may be performed by insert injection molding.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
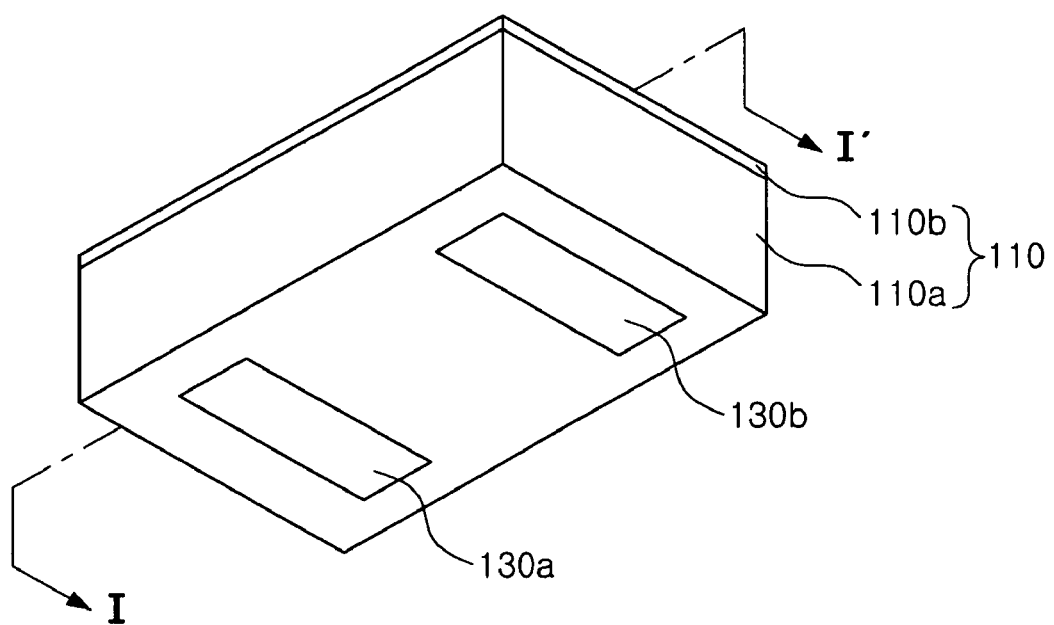
FIG. 1A is a schematic perspective view illustrating an electric double layer capacitor according to an exemplary embodiment of the present invention.

Exemplary embodiments of the present invention will now be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art. It should be considered that the shapes and dimensions of elements in the drawings may be exaggerated for clarity. Throughout the drawings, the same reference numerals will be used to designate the same or like elements.

Figure 1B:
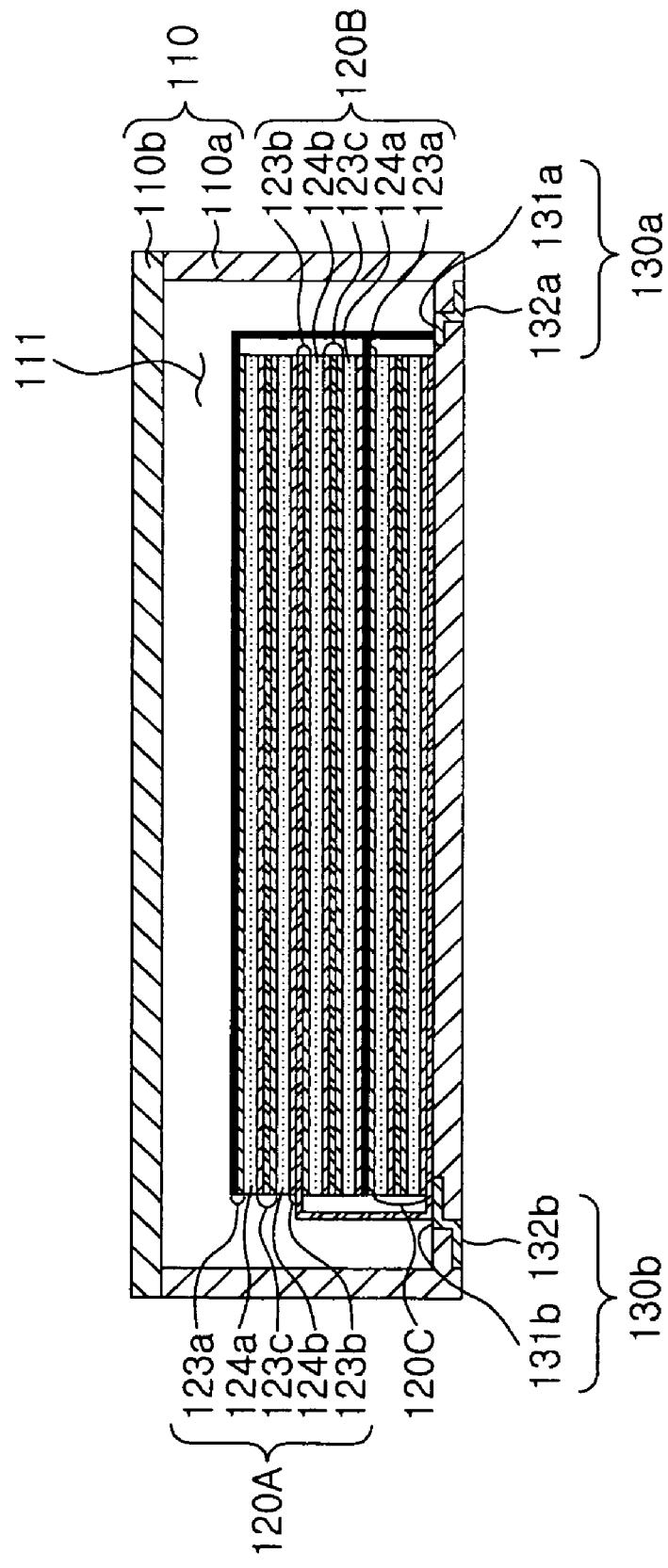
FIG. 1B is a schematic cross-sectional view illustrating the electric double layer capacitor of FIG. 1A, taken along line I-I'.

FIG. 1A is a schematic perspective view illustrating an electric double layer capacitor according to an exemplary embodiment of the present invention. FIG. 1B is a schematic cross-sectional view illustrating the electric double layer capacitor of FIG. 1A, taken along line I-I'.

With reference to FIGS. 1A and 1B, an electric double layer capacitor according to this embodiment includes an exterior case 110 having a housing space 111 therein and formed of insulating resin, and a chip-type electric double layer capacitor cell 120 disposed in the housing space 111 of the exterior case 110.

The exterior case 110 includes first and second external terminals 130a and 130b buried therein. The first external terminal 130a has a first surface 131a exposed to the housing space 111 and a second surface 132a exposed to the outside of the exterior case 110, and the second external terminal 130b has a first surface 131b exposed to the housing space 111 and a second surface 132b exposed to the outside of the exterior case 110. That is, the first and second external terminals 130a and 130b are structures for connecting the outside of the exterior case 110 and the housing space 111.

The exterior case 110 may be formed such that the insulating resin and the first and second external terminals 130a and 130b are integrated by insert injection molding or the like.

The chip-type electric double layer capacitor cell 120 is disposed in the housing space 111 of the exterior case 110. The chip-type electric double layer capacitor cell 120 is electrically connected to the first surfaces 131a and 131b of the first and second external terminals 130a and 130b exposed to the housing space 111. The second surfaces 132a and 132b of the first and second external terminals 130a and 130b may be used to electrically connect the chip-type electric double layer capacitor cell 120 to an external power source.

The first and second external terminals 130a and 130b may be formed on the same surface of the exterior case 110. Otherwise, although not shown, the first and second external terminals 130a and 130b may be individually formed on the different surfaces of the exterior case 110.

When the first and second external terminals 130a and 130b are formed on the same surface, the electric double layer capacitor itself may be surface-mounted using surface-mount technology (SMT) without any additional structure. In order to implement such a structure, the first and second external terminals 130a and 130b and the exterior case 110 may form a single plane.

The chip-type electric double layer capacitor cell 120 may include first and second electrodes 123a and 123b, an induction electrode layer 123c disposed between the first and second electrodes 123a and 123b, and first and second separators 124a and 124b respectively disposed between the first electrode 123a and the induction electrode layer 123c and between the second electrode 123b and the induction electrode layer 123c.

More specifically, the chip-type electric double layer capacitor cell 120 may be formed by stacking at least one of unit cells 120A, 120B and 120O including the first and second electrodes 123a and 123b, at least one induction electrode layer 123c disposed between the first and second electrodes 123a and 123b, and the first and second separators 124a and 124b respectively disposed between the first electrode 123a and the induction electrode layer 123c and between the second electrode 123b and the induction electrode layer 123c. Although not shown, the chip-type electric double layer capacitor cell 120 may be configured as a single unit cell.

Figure 2A:
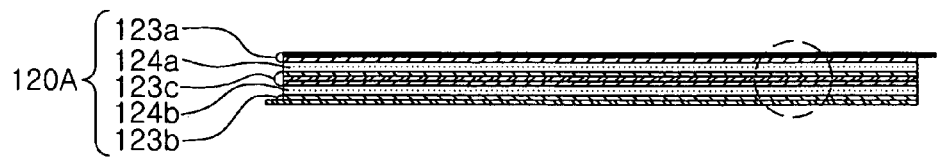
FIG. 2A is a schematic cross-sectional view illustrating a unit cell included in a chip-type electric double layer capacitor cell according to an exemplary embodiment of the present invention.
Figure 2B:
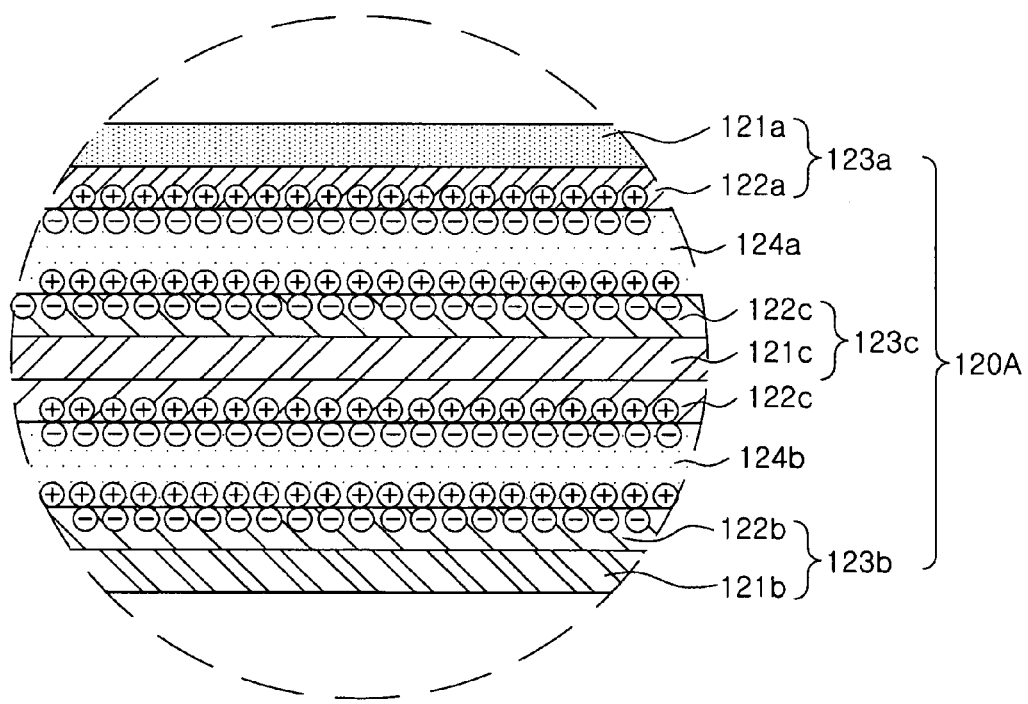
FIG. 2B is a schematic view illustrating a charge distribution and polarization state in the unit cell of FIG. 2A.

FIG. 2A is a schematic cross-sectional view illustrating a unit cell included in a chip-type electric double layer capacitor cell according to an exemplary embodiment of the present invention. FIG. 2B is a schematic view illustrating a charge distribution and polarization state in the unit cell of FIG. 2A.

With reference to FIGS. 2A and 2B, the chip-type electric double layer capacitor cell 120A includes the first and second electrodes 123a and 123b, the induction electrode layer 123c disposed between the first and second electrodes 123a and 123b, and the first and second separators 124a and 124b respectively disposed between the first electrode 123a and the induction electrode layer 123c and between the second electrode 123b and the induction electrode layer 123c.

The first and second electrodes 123a and 123b face each other and have electricity of different polarities applied thereto. The first electrode 123a may include a first current collector 121a and a first electrode material 122a formed on the first current collector 121a. The second electrode 123a may include a second current collector 121b and a second electrode material 122b formed on the second current collector 121b. Also, in order to stack the unit cells as shown in FIG. 1B, the first and second electrodes 123a and 123b may be a double-sided electrode having electrode materials formed on both surfaces of the current collectors.

The first and second current collectors 121a and 121b are conductive sheets for transferring an electrical signal to the first and second electrode materials 122a and 122b, respectively. The first and second current collectors 121a and 121b may be formed of a conductive polymer, a rubber sheet, or a metallic foil. In this embodiment, the chip-type electric double layer capacitor cell 120A is electrically connected to the first and second external terminals 130a and 130b through the first and second current collectors 121a and 121b. The shapes of the first and second current collectors 121a and 121b may be properly modified in such a manner that they are electrically connected to the first and second external terminals 130a and 130b, respectively. Such a modification may be influenced by the shape or size of the chip-type electric double layer capacitor cell 120A.

When the first and second electrodes 123a and 123b do not include the first and second current collectors 121a and 121b, the first and second electrode materials 122a and 122b may be formed by using a solid-state sheet.

The first and second electrode materials 122a and 122b may be a polarizable electrode material. For example, activated carbon with a relatively high specific surface area may be used. The first and second electrodes 123a and 123b may be manufactured by adhering electrode material slurry, consisting mainly of powdered activated carbon, onto the first and second current collectors 121a and 121b.

The induction electrode layer 123c to which electricity is not applied is disposed between the first and second electrodes 123a and 123b. The induction electrode layer 123c may include a third current collector 121c and an electrode material 122c formed on the third current collector 121c. The electrode material 122c may be formed on both surfaces of the third current collector 121c.

The first and second separators 124a and 124b are disposed between the first electrode 123a and the induction electrode layer 123c and between the second electrode 123b and the induction electrode layer 123c, respectively.

The first and second separators 124a and 124b may be formed of a porous material through which ions can permeate. For example, a porous material such as polypropylene, polyethylene, or glass fiber may be used. However, the material is not limited thereto.

With reference to FIG. 2B, the chip-type electric double layer capacitor cell includes four electric double layers. When electricity is applied to the first and second electrodes 123a and 123b, the first and second electrodes 123a and 123b may be polarized to have positive and negative polarities, respectively, so that the electric double layers are formed on the facing surfaces of the first and second electrodes 123a and 123b. Also, even though electricity is not applied to the induction electrode layer 123c, charge layers (electric double layers) are formed on the induction electrode layer 123c due to induced electricity by disposing the induction electrode layer 123c between the first and second electrodes 123a and 123b.

According to the present invention, the number of electrodes facing each other increases and the area of the facing surfaces of the electrodes increases, whereby the number of charge layers increases. Accordingly, this causes an increase in a surge voltage and an operating voltage in the chip-type electric double layer capacitor cell.

There is no limitation in the number of the induction electrode layer 123c disposed between the first and second electrodes 123a and 123b. At least one induction electrode layer 123c may be provided. When one or more induction electrode layers 123c are provided, a separator may be disposed between the induction electrode layers 123c. As the number of the induction electrode layers 123c increases, the area of the facing surfaces of the electrodes increases, and accordingly, the surge voltage and the operating voltage may be increased.

According to this embodiment, the exterior case 110 may include a lower case 110a having the housing space 111 of which a top surface is opened and the first and second external terminals 130a and 130b buried therein, and an upper cap 110b mounted on the lower case 110a so as to cover the housing space 111.

The exterior case 110 may be formed of insulating resin. The insulating resin may be polyphenylene sulfide (PPS) or liquid crystal polymer (LCP). However, the insulating resin is not limited thereto. Accordingly, the electric double layer capacitor may protect its internal structure during the surface mounting (SMT) process which is performed at a high temperature of about 240° C. to 270° C.

Figure 3A:
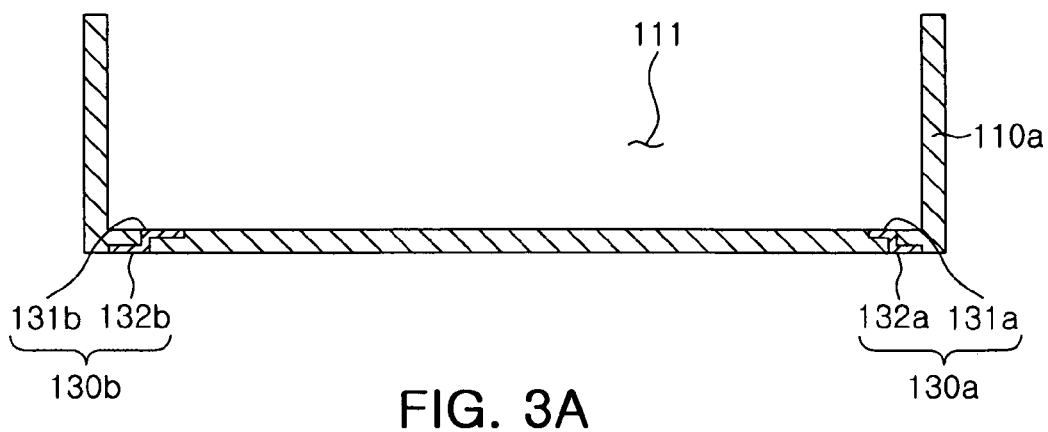
FIGS. 3A through 3C are cross-sectional views illustrating a method of manufacturing an electric double layer capacitor according to an exemplary embodiment of the present invention.
Figure 3B:
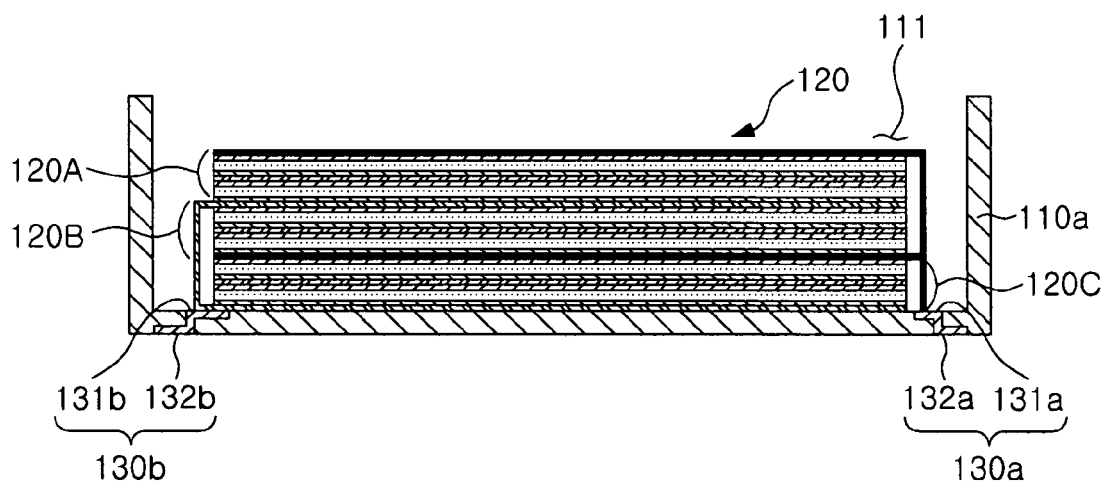
Figure 3C:
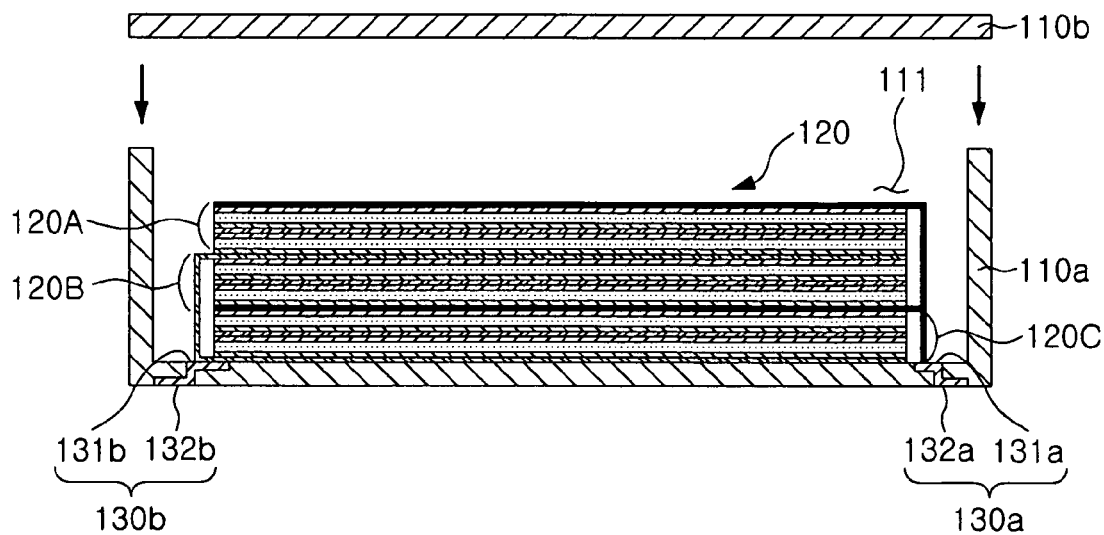

FIGS. 3A through 3C are cross-sectional views illustrating a method of manufacturing an electric double layer capacitor according to an exemplary embodiment of the present invention.

First, as shown in FIG. 3A, the lower case 110a is formed such that the lower case 110a has the opened housing space 111 and includes the first and second external terminals 130a and 130b buried therein. The first external terminal 130a has the first surface 131a exposed to the housing space 111 and the second surface 132a exposed to the outside of the lower case 110a. The second external terminal 130b has the first surface 131b exposed to the housing space 111 and the second surface 132b exposed to the outside of the lower case 110a.

The process of forming the lower case 110a is not specifically limited, as long as insulating resin and the first and second external terminals 130a and 130b may be integrally molded so that the first and second external terminals 130a and 130b are buried in the insulating resin. For example, insert injection molding may be applied.

More specifically, the first and second external terminals 130a and 130b are disposed in a mold having a desired lower-case shape, and the insulating resin is injected into the mold. The insulating resin injected into the mold hardens with the first and second external terminals 130a and 130b in the mold through cooling or cross-linking. The insulating resin and the first and second external terminals 130a and 130b are integrated by the insert injection molding, even though the first and second external terminals 130a and 130b are formed of a different material from the insulating resin.

Next, as shown in FIG. 3B, the chip-type electric double layer capacitor cell 120 is mounted in the housing space 111 so as to be electrically connected to the first surfaces 131a and 131b of the first and second external terminals 130a and 130b exposed to the housing space 111 of the lower case 110a.

The chip-type electric double layer capacitor cell 120A may be manufactured by sequentially stacking the first electrode 123a, the first separator 124a, the induction electrode layer 123c, the second separator 124b and the second electrode 123b.

As described above, the first and second electrodes 123a and 123b may be manufactured by forming the first and second electrode materials 122a and 122b on the first and second current collectors 121a and 121b, respectively.

Also, one or more induction electrode layers 123c may be stacked between the first and second electrodes 123a and 123b. The induction electrode layer 123c may be formed to include the third current collector 121c and the electrode material 122c formed on both surfaces of the third current collector 121c.

The chip-type electric double layer capacitor cell 120 may be manufactured by stacking at least one of the unit cells 120A, 120B and 120C, each of which includes the first and second electrodes 123a and 123b, the induction electrode layer 123c disposed between the first and second electrodes 123a and 123b, and the first and second separators 124a and 124b respectively disposed between the first electrode 123a and the induction electrode layer 123c and between the second electrode 123b and the induction electrode layer 123c.

Although not shown, the chip-type electric double layer capacitor cell 120 may be configured as a single unit cell.

Then, as shown in FIG. 3C, the lower case 110a having the chip-type electric double layer capacitor cell 120 mounted therein is filled with an electrolyte. Here, an aqueous electrolyte or non-aqueous electrolyte may be used as the electrolyte. Finally, the upper cap 110b is mounted on the lower case 110a so as to cover the housing space 111.

As set forth above, according to exemplary embodiments of the invention, a chip-type electric double layer capacitor cell includes first and second electrodes to which electricity is applied and at least one induction electrode layer to which electricity is not applied. The chip-type electric double layer capacitor cell has an increase in the number of charge layers due to an increase in the number of electrodes and the area of the facing surfaces of the electrodes. Accordingly, this results in an increase in the surge voltage and the operating voltage in the chip-type electric double layer capacitor cell.

An electric double layer capacitor including the chip-type electric double layer capacitor cell is formed such that its exterior case and external terminals are integrated, thereby having high space utilization efficiency. Accordingly, it can be miniaturized and have a high energy storage density due to an increase in the surge voltage and the operating voltage.

While the present invention has been shown and described in connection with the exemplary embodiments, it will be apparent to those skilled in the art that modifications and variations can be made without departing from the spirit and scope of the invention as defined by the appended claims.

What is claimed is:

1. A chip-type electric double layer capacitor cell comprises:
    first and second electrodes facing each other and having electricity of opposite polarities applied thereto;
    at least one induction electrode layer disposed between the first and second electrodes and having no electricity applied thereto; and
    first and second separators disposed between the first electrode and the induction electrode layer and between the second electrode and the induction electrode layer, respectively.

2. The chip-type electric double layer capacitor cell of claim 1, wherein the induction electrode layer includes a current collector and an electrode material formed on both surfaces of the current collector.

3. An electric double layer capacitor comprises:
an exterior case having a housing space provided therein and formed of insulating resin;
first and second external terminals buried in the exterior case, each having a first surface exposed to the housing space and a second surface exposed to an outside of the exterior case; and
a chip-type electric double layer capacitor cell disposed in the housing space and electrically connected to the first surface,
wherein the chip-type electric double layer capacitor cell comprises:
first and second electrodes facing each other and having electricity of opposite polarities applied thereto;
at least one induction electrode layer disposed between the first and second electrodes and having no electricity applied thereto; and
first and second separators disposed between the first electrode and the induction electrode layer and between the second electrode and the induction electrode layer, respectively.

4. The electric double layer capacitor of claim 3, wherein the induction electrode layer includes a current collector and an electrode material formed on both surfaces of the current collector.

5. The electric double layer capacitor of claim 3, wherein the chip-type electric double layer capacitor cell comprises stacked unit cells, each including the first and second electrodes facing each other and having electricity of opposite polarities applied thereto, the at least one induction electrode layer disposed between the first and second electrodes and having no electricity applied thereto, and the first and second separators disposed between the first electrode and the induction electrode layer and between the second electrode and the induction electrode layer, respectively.

6. The electric double layer capacitor of claim 3, wherein the exterior case is formed such that the insulating resin and the first and second external terminals are integrated.

7. The electric double layer capacitor of claim 3, wherein the first and second external terminals are formed on the same surface of the exterior case.

8. The electric double layer capacitor of claim 3, wherein the exterior case comprises:
a lower case having the housing space of which a top surface is opened and including the first and second external terminals buried therein; and
an upper cap mounted on the lower case so as to cover the housing space.

9. A method of manufacturing an electric double layer capacitor, the method comprising:
forming a lower case including a housing space of which a top surface is opened by integrating insulating resin and first and second external terminals, each of the first and second external terminals having a first surface exposed to the housing space and a second surface exposed to an outside of the lower case;
preparing a chip-type electric double layer capacitor cell including first and second electrodes facing each other and having electricity of opposite polarities applied thereto, at least one induction electrode layer disposed between the first and second electrodes and having no electricity applied thereto, and first and second separators respectively disposed between the first electrode and the induction electrode layer and between the second electrode and the induction electrode layer;
mounting the chip-type electric double layer capacitor cell in the housing space such that the chip-type electric double layer capacitor cell is electrically connected to the first surface exposed to the housing space; and
mounting an upper cap on the lower case so as to cover the housing space.

10. The method of claim 9, wherein the induction electrode layer includes a current collector and an electrode material formed on both surfaces of the current collector.

11. The method of claim 9, wherein the chip-type electric double layer capacitor cell comprises stacked unit cells, each including the first and second electrodes facing each other and having electricity of opposite polarities applied thereto, the at least one induction electrode layer disposed between the first and second electrodes and having no electricity applied thereto, and the first and second separators respectively disposed between the first electrode and the induction electrode layer and between the second electrode and the induction electrode layer.

12. The method of claim 9, wherein the forming of the lower case is performed by insert injection molding.

* * * * *